US012106877B2

(12) United States Patent
Matsumoto et al.

(10) Patent No.: US 12,106,877 B2
(45) Date of Patent: Oct. 1, 2024

(54) CHIP RESISTOR FOR REDUCING STRAY CAPACITANCE

(71) Applicant: Panasonic Intellectual Property Management Co., Ltd., Osaka (JP)

(72) Inventors: Sayaka Matsumoto, Hokkaido (JP); Ken Yanai, Hokkaido (JP); Masashi Takamura, Hokkaido (JP); Masaya Hattori, Tokyo (JP); Tomomitsu Muraishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 17/768,271

(22) PCT Filed: Sep. 24, 2020

(86) PCT No.: PCT/JP2020/036012

§ 371 (c)(1),
(2) Date: Apr. 12, 2022

(87) PCT Pub. No.: WO2021/095368

PCT Pub. Date: May 20, 2021

(65) Prior Publication Data

US 2023/0134880 A1 May 4, 2023

(30) Foreign Application Priority Data

Nov. 12, 2019 (JP) ................................ 2019-204344
Feb. 7, 2020 (JP) ................................ 2020-019475

(51) Int. Cl.
*H01C 1/14* (2006.01)
*H01C 7/10* (2006.01)
*H01C 7/18* (2006.01)

(52) U.S. Cl.
CPC ................ *H01C 1/14* (2013.01); *H01C 7/10* (2013.01); *H01C 7/18* (2013.01)

(58) Field of Classification Search
CPC .............. H01C 1/14; H01C 7/10; H01C 7/18
See application file for complete search history.

(56) References Cited

U.S. PATENT DOCUMENTS 10,706,995 B1 * 7/2020 Uchida .................... H01C 7/12
11,195,643 B2 * 12/2021 Feichtinger ............ H01C 7/112
(Continued)

FOREIGN PATENT DOCUMENTS

JP 63-211602 9/1988
JP 4-277601 10/1992

OTHER PUBLICATIONS

International Search Report of PCT application No. PCT/JP2020/036012 dated Dec. 15, 2020.

*Primary Examiner* — Kyung S Lee
(74) *Attorney, Agent, or Firm* — Rimon P.C.

(57) ABSTRACT

It is aimed to provide a laminated varistor capable of reducing stray capacitance to occur between an internal electrode and an external electrode, and also capable of reducing a variation in the stray capacitance due to a variation in the external electrode. A laminated varistor of the present disclosure has external electrodes on first end surface, second end surface, and first side surface of sintered body. No external electrode is provided on second side surface opposite to first side surface. Varistor regions in which internal electrodes overlap each other in a laminating direction are provided at positions closer to second side surface than to first side surface.

15 Claims, 11 Drawing Sheets

(56) References Cited

U.S. PATENT DOCUMENTS

| | | | | |
|---|---|---|---|---|
| 2005/0212648 A1* | 9/2005 | Liu | H01C 7/18 | 338/21 |
| 2009/0154052 A1* | 6/2009 | Yoneda | H01T 4/12 | 361/220 |
| 2011/0043963 A1* | 2/2011 | Bultitude | H01G 2/16 | 29/25.42 |
| 2012/0079693 A1* | 4/2012 | Bultitude | H01G 2/16 | 29/25.41 |

* cited by examiner

CHIP RESISTOR FOR REDUCING STRAY CAPACITANCE

CROSS-REFERENCE TO RELATED APPLICATIONS

This application is a U.S. national stage application of the PCT International Application No. PCT/JP2020/036012 filed on Sep. 24, 2020, which claims the benefit of foreign priority of Japanese patent application No. 2019-204344 filed on Nov. 12, 2019 and Japanese patent application No. 2020-019475 filed on Feb. 7, 2020, the contents all of which are incorporated herein by reference.

FIELD OF THE INVENTION

The present disclosure relates to a laminated varistor to be used for various electronic devices.

DESCRIPTION OF THE RELATED ART

In recent years, home electric appliances and in-vehicle electronic devices have been becoming smaller and smaller. Varistors that are components of these home electric appliances and in-vehicle electronic devices are also required to be small in size. In addition, as the frequency increases, the capacitance of the varistor affects the performance of a circuit that drives a home electric appliance or an in-vehicle electronic device. Therefore, there is a demand for a varistor having a small capacitance and a small variation in capacitance while securing a predetermined varistor voltage. In addition, when two varistors are used as a pair, it is proposed that the two varistors are combined and formed as one element in order to reduce a difference between the capacitances of the two varistors. As prior art literature information related to the invention of this application, PTL 1 is known as an example.

CITATION LIST

Patent Literature

PTL 1: Unexamined Japanese Patent Publication No. H04-277601

SUMMARY OF THE INVENTION

In the conventional laminated varistors, however, capacitance occurs between two internal electrodes facing each other exhibiting varistor performance, and also stray capacitance occurs between the internal electrode and another external electrode. In particular, the stray capacitance varies due to a variation in the thickness or shape of the external electrode. As a result, a variation in the capacitance of the varistor is likely to occur. Note that the stray capacitance refers, other than capacitance between internal electrodes included in a varistor, to capacitance occurring between the internal electrode and an external electrode and that occurring between the external electrodes or the like.

In response to this problem, the present disclosure discloses a laminated varistor described below.

That is, the laminated varistor according to the present disclosure includes a sintered body, a first external electrode, a second external electrode, a third external electrode, a first internal electrode, a second internal electrode, and a third internal electrode. The sintered body has a rectangular parallelepiped shape having an upper surface and a lower surface, and a first end surface, a first side surface, a second end surface, and a second side surface that are sequentially arranged in a counterclockwise direction as viewed from the upper surface. The sintered body is formed by laminating a plurality of varistor layers. Each of the plurality of varistor layers has a main surface, a back surface, and four end surfaces. Of two adjacent varistor layers, a main surface on one side and a back surface on the other side are joined. The four side surfaces of each of the plurality of varistor layers become the first end surface, the first side surface, the second end surface, and the second side surface of the sintered body. In addition, one of the plurality of varistor layers has a third internal electrode. At least one of the others of the plurality of varistor layers has at least one of a first internal electrode and a second internal electrode. The first external electrode is provided on the first end surface of the sintered body. The second external electrode is provided on the second end surface of the sintered body. The third external electrode is provided on the first side surface of the sintered body. The first internal electrode is electrically connected to the first external electrode. The second internal electrode is electrically connected to the second external electrode. The third internal electrode is electrically connected to the third external electrode. The first internal electrode and the third internal electrode have a first overlap when viewed from the upper surface of the sintered body. A first varistor region is formed by the first overlap. The second internal electrode and the third internal electrode have a second overlap when viewed from the upper surface of the sintered body. A second varistor region is formed by the second overlap. The first varistor region and the second varistor region are arranged at positions closer to the second side surface than to the first side surface.

With the configuration as described above, the stray capacitance to occur between the internal electrode and the external electrode can be reduced. Along with that, a variation in the stray capacitance due to a variation in the width or shape of a surface of the external electrode can also be reduced. As a result, when the two laminated varistors are used as a pair, a variation in the capacitance between the two laminated varistors can be reduced.

DETAILED DESCRIPTION OF THE PREFERRED EMBODIMENTS EMBODIMENT

Hereinafter, laminated varistors according to exemplary embodiments of the present disclosure will be described with reference to the drawings.

First Exemplary Embodiment

Figure 1:
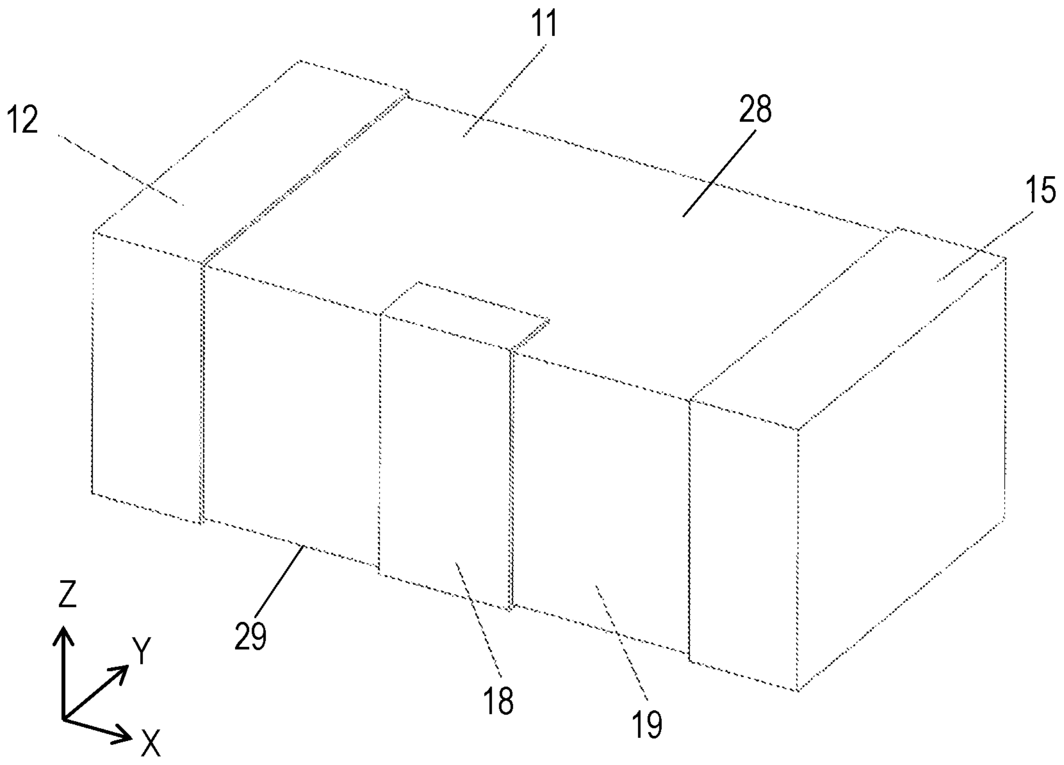
FIG. 1 is a perspective view of a laminated varistor according to a first exemplary embodiment of the present disclosure.
Figure 2:
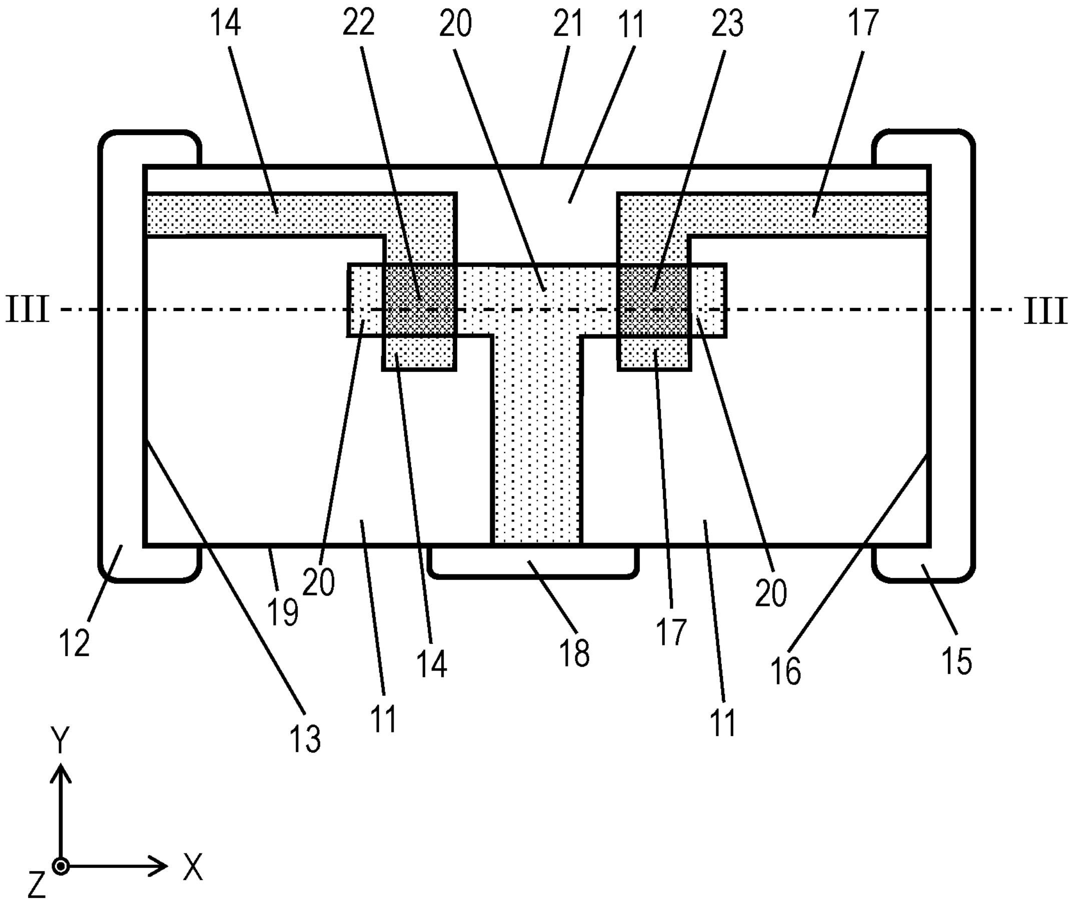
FIG. 2 is a transparent view of the laminated varistor according to the first exemplary embodiment.
Figure 3:
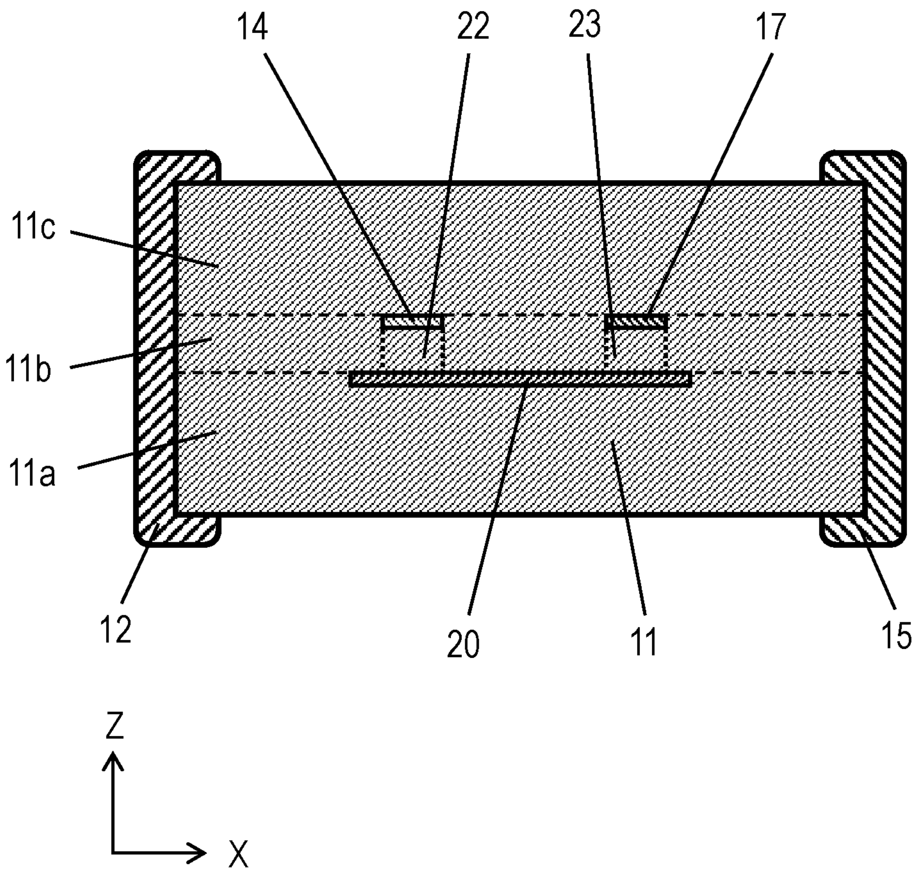
FIG. 3 is a cross-sectional view of the laminated varistor.
Figure 4:
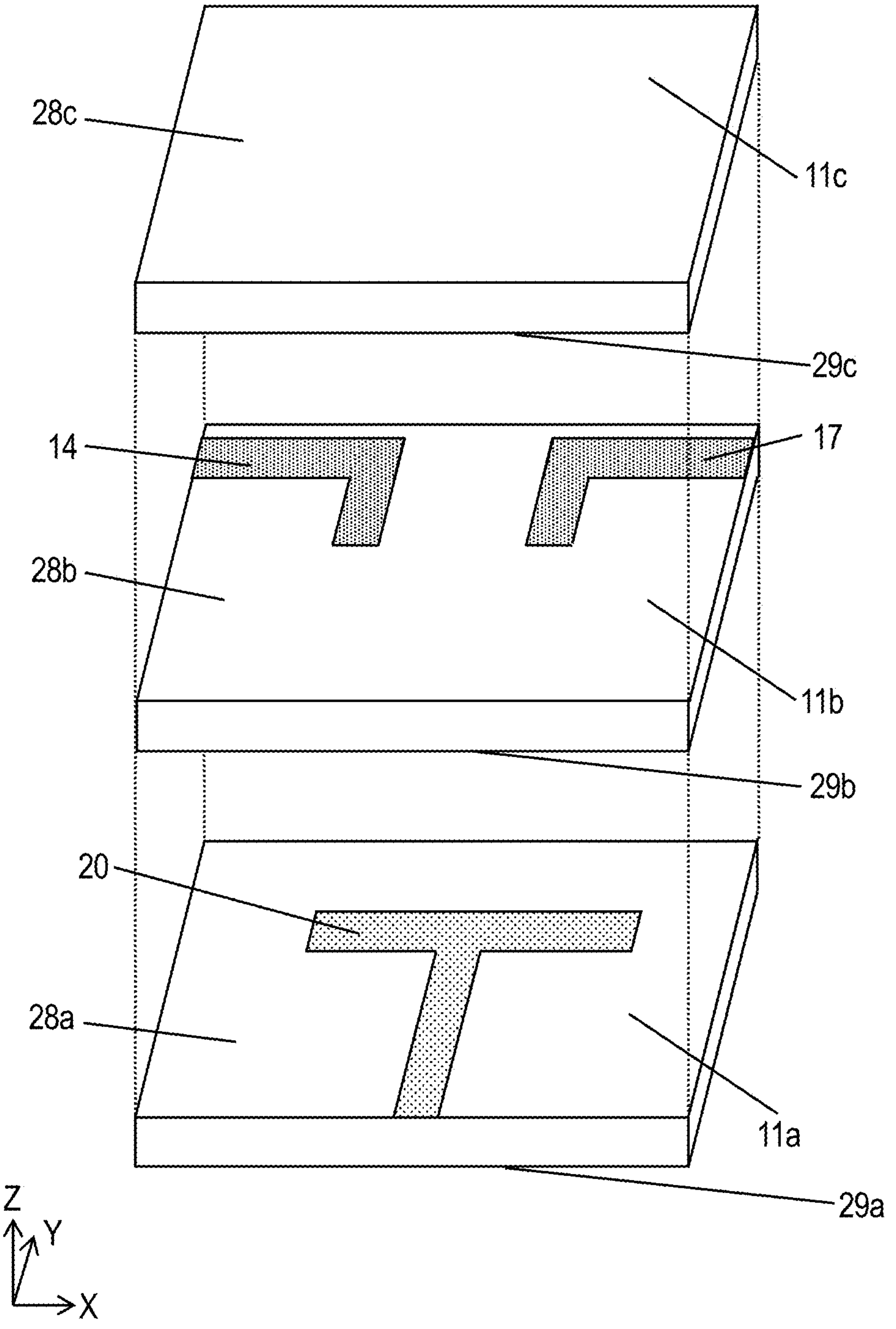
FIG. 4 is an exploded perspective view of each layer of a sintered body constituting the laminated varistor.

FIG. 1 is a perspective view of a laminated varistor according to a first exemplary embodiment of the present disclosure. FIG. 2 is a transparent view of the laminated varistor as viewed from above. FIG. 3 is a cross-sectional view of the laminated varistor of FIG. 2, taken along line FIG. 4 is an exploded perspective view of each layer of a sintered body constituting the laminated varistor according to the first exemplary embodiment of the present disclosure. The sintered body of the laminated varistor, excluding an external electrodes, has a rectangular parallelepiped shape with a length of 1.6 mm, a width of 0.8 mm, and a height of 0.6 mm.

Sintered body 11 contains ZnO as a main component, and contains, as accessory components, $Bi_2O_3$, $Co_2O_3$, $MnO_2$, $Sb_2O_3$, and the like, or $Pr_6O_{11}$, $Co_2O_3$, $CaCO_3$, $Cr_2O_3$, and the like. The sintered body has a form in which ZnO is sintered and at their grain boundaries, the other accessory components are precipitated. In addition, internal electrodes are formed in a plurality of varistor layers constituting sintered body 11.

Sintered body 11 has upper surface 28 and lower surface 29, and first end surface 13, first side surface 19, second end surface 16, and second side surface 21 that are sequentially arranged in a counterclockwise direction as viewed from upper surface 28.

Note that a direction perpendicular to first end face 13 is defined as an X axis. A direction moving from first end surface 13 toward second end surface 16 is defined as a positive direction of the X axis. A direction perpendicular to first side face 19 is defined as a Y axis. A direction moving from first side surface 19 toward second side surface 21 is defined as a positive direction of the Y axis. A direction perpendicular to lower surface 29 is defined as a Z axis. A direction moving from lower surface 29 toward upper surface 28 is defined as a positive direction of the Z axis.

First external electrode 12 is provided on first end surface 13 of sintered body 11. Second external electrode 15 is provided on second end surface 16 of sintered body 11. Third external electrode 18 is provided on first side surface 19 of sintered body 11. An external electrode is not provided on second side surface 21 of sintered body 11.

As illustrated in FIGS. 3 and 4, sintered body 11 includes first varistor layer 11*a*, second varistor layer 11*b*, and third varistor layer 11*c*. Each of first varistor layer 11*a*, second varistor layer 11*b*, and third varistor layer 11*c* includes a layer that contains ZnO as a main component, and contains, as accessory components, $Bi_2O_3$, $Co_2O_3$, $MnO_2$, $Sb_2O_3$, and the like, or $Pr_6O_{11}$, $Co_2O_3$, $CaCO_3$, $Cr_2O_3$, and the like. First varistor layer 11*a* has main surface 28*a* and back surface 29*a*. Third internal electrode 20 is formed in main surface 28*a*. Second varistor layer 11*b* has main surface 28*b* and back surface 29*b*. First internal electrode 14 and second internal electrode 17 are formed in main surface 28*b*. Third varistor layer 11*c* has main surface 28*c* and back surface 29*c*. First varistor layer 11*a*, second varistor layer 11*b*, and third varistor layer 11*c* are overlapped such that: main surface 28*a* of first varistor layer 11*a* is in contact with back surface 29*b* of second varistor layer 11*b*; and main surface 28*b* of second varistor layer 11*b* is in contact with back surface 29*c* of third varistor layer 11*c*. First varistor layer 11*a*, second varistor layer, and third varistor layer 11*c* that are overlapped in this way are sintered to form sintered body 11. Note that first back surface 29*a* matches lower surface 29 of sintered body 11. Third main surface 28*c* matches upper surface 28 of sintered body 11. Four side surfaces of each of first varistor layer 11*a*, second varistor layer, and third varistor layer 11*c* become first end surface 13, first side surface 19, second end surface 16, and second side surface 21 of sintered body 11, respectively.

First external electrode 12 is electrically connected to first internal electrode 14. Second external electrode 15 is electrically connected to second internal electrode 17. Third external electrode 18 is electrically connected to third internal electrode 20.

When viewed from upper surface 28 of sintered body 11, a part of first internal electrode 14 and a part of third internal electrode 20 overlap. As a result, first varistor region 22 is formed. When viewed from upper surface 28 of sintered body 11, a part of second internal electrode 17 and a part of third internal electrode 20 also overlap. As a result, second varistor region 23 is formed. With such a configuration, the laminated varistor can be efficiently produced.

First internal electrode 14 is connected to first external electrode 12 at a position closer to second side surface 21 than to first side surface 19. First internal electrode 14 is extended from first end surface 13 toward second end surface 16, and then is extended toward first side surface 19 by being bent at a substantially right angle. When viewed from upper surface 28 of sintered body 11, first internal electrode 14 overlaps third internal electrode 20 at a portion where first internal electrode 14 is extended toward first side surface 19 by being bent. As a result, first varistor region 22 is formed. The position where first internal electrode 14 is bent is closer to second side surface 21 than third internal electrode 20 is.

Similarly, second internal electrode 17 is connected to second external electrode 15 at a position closer to second side surface 21 than to first side surface 19. Second internal electrode 17 is extended from second end surface 16 toward first end surface 13, and then is extended toward first side surface 19 by being bent at a substantially right angle. When viewed from upper surface 28 of sintered body 11, second internal electrode 17 overlaps third internal electrode 20 at a portion where second internal electrode 17 is extended toward first side surface 19 by being bent. As a result, second varistor region 23 is formed. The position where second internal electrode 17 is bent is closer to second side surface 21 than third internal electrode 20 is.

Here, an interval (thickness of the varistor region) in a lamination direction (Z-axis direction) between first internal electrode 14 and third internal electrode 20 is set to about 35 μm.

First varistor region 22 and second varistor region 23 are formed at positions closer to second side surface 21 than to first side surface 19. By doing in this way, it is possible to cause almost no stray capacitance between third external electrode 18 and first internal electrode 14 or second internal electrode 17. As a result, stray capacitance to occur between the internal electrode and the external electrode of the laminated varistor can be reduced, and a variation in the stray capacitance due to a variation in the shape or dimension of the external electrode can also be reduced. Furthermore, it is more desirable to provide the whole of first varistor region 22 and second varistor region 23 at a position closer to second side surface 21 than an intermediate position between first side surface 19 and second side surface 21 is.

A tip portion of first internal electrode 14 protrudes from first varistor region 22 by about 50 μm. Furthermore, a tip portion of second internal electrode 17 also protrudes from second varistor region 23 by about 50 μm. Similarly, a tip portion of third internal electrode 20 also protrudes from first varistor region 22 and second varistor region 23 by about 50 μm. By making the tip portions of the internal electrodes protrude in this way from the varistor regions where the internal electrodes overlap each other, a variation in capacitance can be suppressed with respect to a misalignment of the internal electrodes. The length of the protrusion is desirably more than or equal to the thickness of the varistor region and less than or equal to five times the thickness. This is because: if the length of the protrusion is less than the thickness of the varistor region, the variation in capacitance cannot be sufficiently suppressed with respect to the misalignment of the internal electrodes; and if the length is more than five times, the stray capacitance is likely to be large.

Second Exemplary Embodiment

Figure 5:
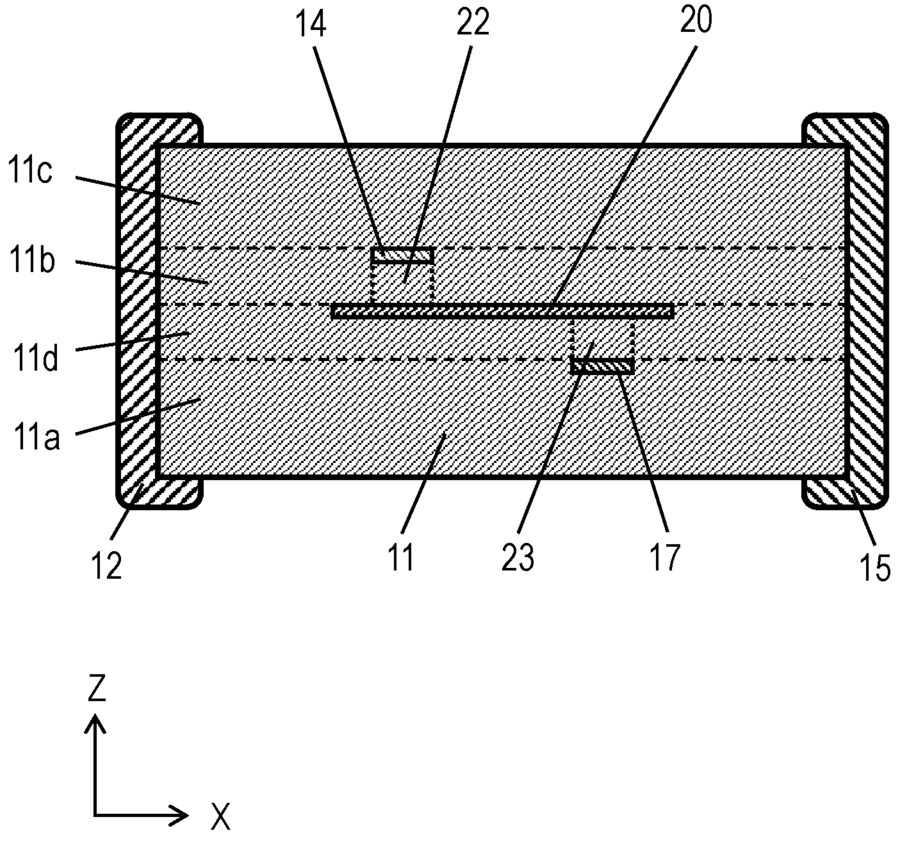
FIG. 5 is a cross-sectional view of a laminated varistor according to a second exemplary embodiment of the present disclosure.

FIG. 5 is a cross-sectional view of a laminated varistor according to a second exemplary embodiment of the present disclosure. The appearance of the laminated varistor is the same as in FIG. 1. In the laminated varistor illustrated in FIG. 3, first internal electrode 14 and second internal electrode 17 are provided in the same layer. On the other hand, in the laminated varistor illustrated in FIG. 5, fourth varistor layer 11*d* is provided between first varistor layer 11*a* and second varistor layer 11*b*. First internal electrode 14 is formed in a main surface of second varistor layer 11*b*. Second internal electrode 17 is formed in a main surface of first varistor layer 11*a*. Third internal electrode 20 is formed in a main surface of fourth varistor layer 11*d*. First varistor region 22 and second varistor region 23 are provided not to overlap each other when viewed from the upper surface of sintered body 11. With such a configuration, interaction between first internal electrode 14 and second internal electrode 17 can be reduced.

Third Exemplary Embodiment

Figure 6:
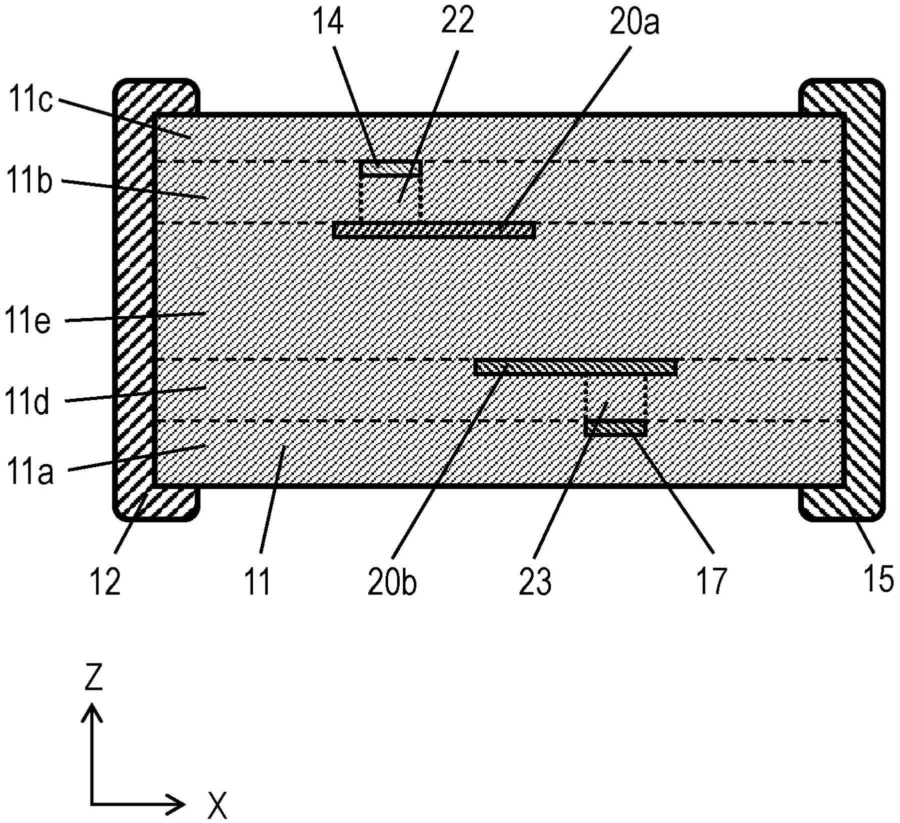
FIG. 6 is a cross-sectional view of a laminated varistor according to a third exemplary embodiment of the present disclosure.

FIG. 6 is a cross-sectional view of a laminated varistor according to a third exemplary embodiment of the present disclosure. The appearance of the laminated varistor is the same as in FIG. 1. In the laminated varistor according to the third exemplary embodiment, fourth varistor layer 11*d* and fifth varistor layer 11*e* are sequentially provided between first varistor layer 11*a* and second varistor layer 11*b*. In addition, third internal electrodes 20*a*, 20*b* are electrically connected to third external electrodes. First internal electrode 14 is formed in a main surface of second varistor layer 11*b*. Second internal electrode 17 is formed in a main surface of first varistor layer 11*a*. Third internal electrode 20*a* on one side is formed in a main surface of fifth varistor layer 11*e*. Third internal electrode 20*b* on the other side is formed in a main surface of fourth varistor layer 11*d*. With third internal electrode 20*a* overlapping first internal electrode 14 when viewed from upper surface 28 of first varistor layer 11*a*, first varistor region 22 is formed. With third internal electrode 20*b* overlapping second internal electrode 17 when viewed from upper surface 28 of first varistor layer 11*a*, second varistor region 23 is formed. First varistor region 22 and second varistor region 23 are provided not to overlap each other when viewed from upper surface 28 of first varistor layer 11*a*. With such a configuration, interaction between the first internal electrode and the second internal electrode can be further reduced.

Note that different materials may be used for the layers constituting first varistor region 22 and second varistor region 23 and for the other layers. In this case, a relative permittivity of the layer not constituting the varistor region is set to be smaller than a relative permittivity of the layer constituting the varistor region. By doing in this way, the stray capacitance can be further reduced, and the variation in capacitance of the laminated varistor can also be reduced.

Fourth Exemplary Embodiment

Figure 7:
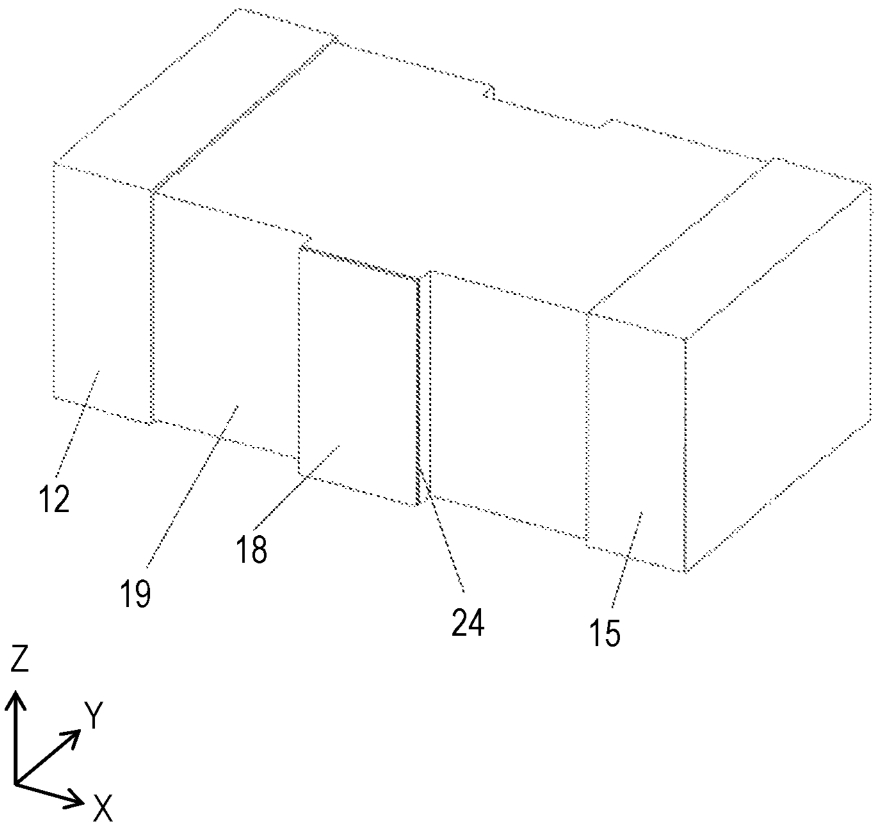
FIG. 7 is a perspective view of a laminated varistor according to a fourth exemplary embodiment of the present disclosure.
Figure 8:
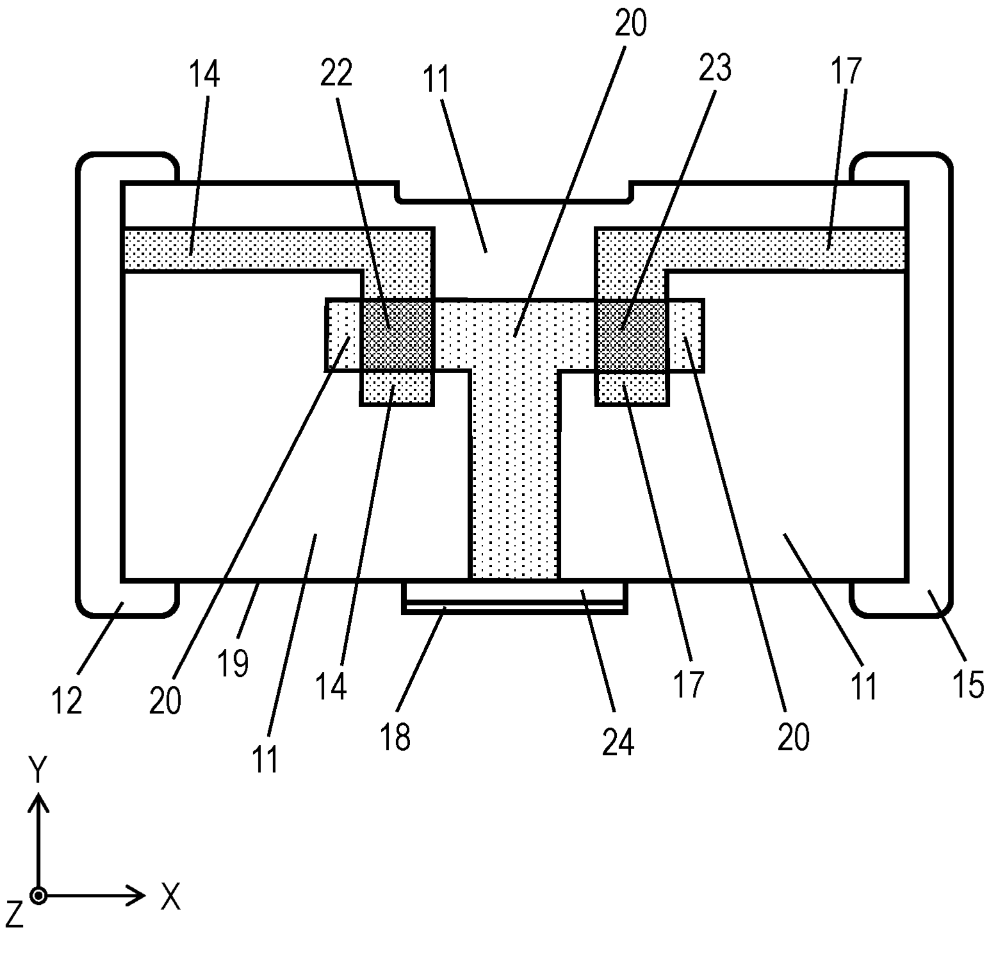
FIG. 8 is a transparent view of the laminated varistor according to the fourth exemplary embodiment.

FIG. 7 is a perspective view of a further different laminated varistor according to a fourth exemplary embodiment of the present disclosure. FIG. 8 is a transparent view of the laminated varistor as viewed from above. The laminated varistor of FIG. 7 is different from the laminated varistor of FIG. 1 in that convex part 24 is provided on first side surface 19 and third external electrode 18 is provided on convex part 24.

Convex part 24 is provided in a central portion of first side surface 19 and from the bottom surface to the upper surface. Its height (a height protruding from the first side surface) is set to about 50 μm to 200 μm.

Usually, a laminated varistor is obtained by: laminating varistor green sheets on each of which an electrode pattern to become an internal electrode has been printed; then cutting into individual pieces; sintering the pieces; and forming external electrodes. When cutting into individual pieces, the cutting is performed with a blade having a shape in which a convex part is provided in a region to become a side surface. As a result, the convex part can be formed on the first side surface. By providing convex part 24 on first side surface 19 and providing third external electrode 18 on convex part 24 in this way, a distance between first internal electrode 14 and third external electrode 18 and a distance between second internal electrode 17 and third external electrode 18 can be increased. As a result, stray capacitance can be reduced.

In addition, by providing third external electrode 18 on convex part 24, a shape of third external electrode 18 can be stabilized. As a result, a variation in capacitance can be reduced.

In addition, by providing convex part 24, the surface on which third external electrode 18 is to be provided can be easily recognized.

Further, third external electrode 18 is formed by dipping only convex part 24 into electrode paste. As a result, the shape of third external electrode 18 can be stabilized. As a result, the variation in capacitance can be further reduced. In order to form third external electrode 18 by dipping only convex part 24 into electrode paste in this way, the height of convex part 24 is desirably set to be more than or equal to about 50 μm and less than or equal to 200 μm. If the height is small, an effect of suppressing the variation is decreased. On the other hand, if the height is large, connection of a terminal electrode becomes difficult when the height is more than or equal to a solder coating height.

Fifth Exemplary Embodiment

Figure 9:
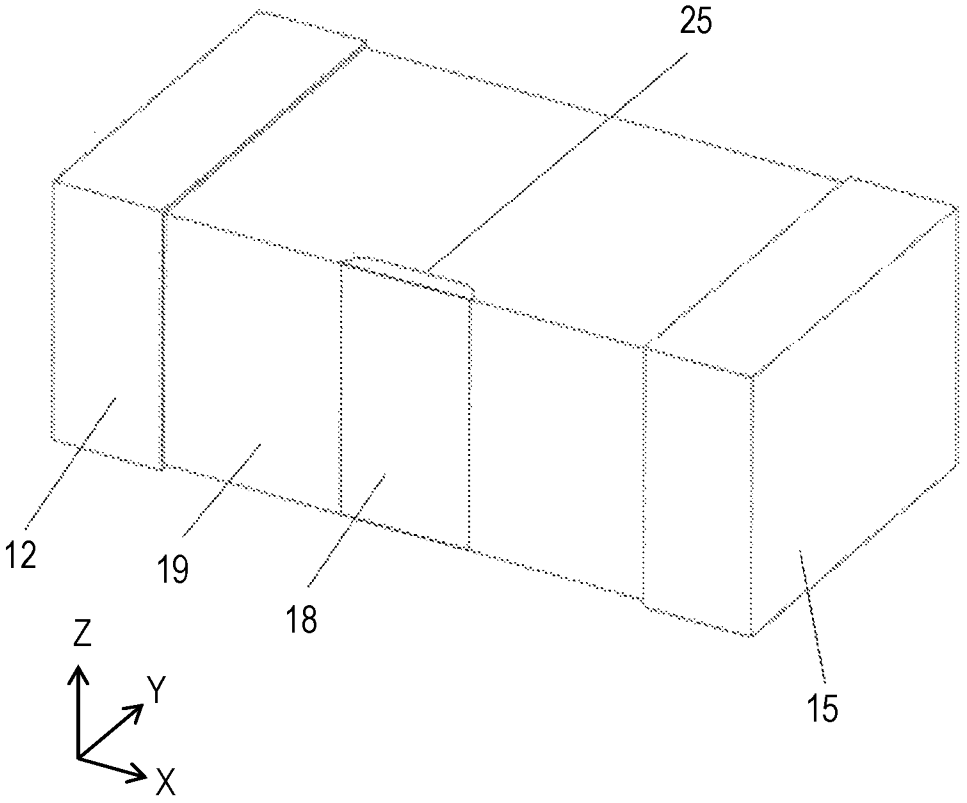
FIG. 9 is a perspective view of a laminated varistor according to a fifth exemplary embodiment of the present disclosure.
Figure 10:
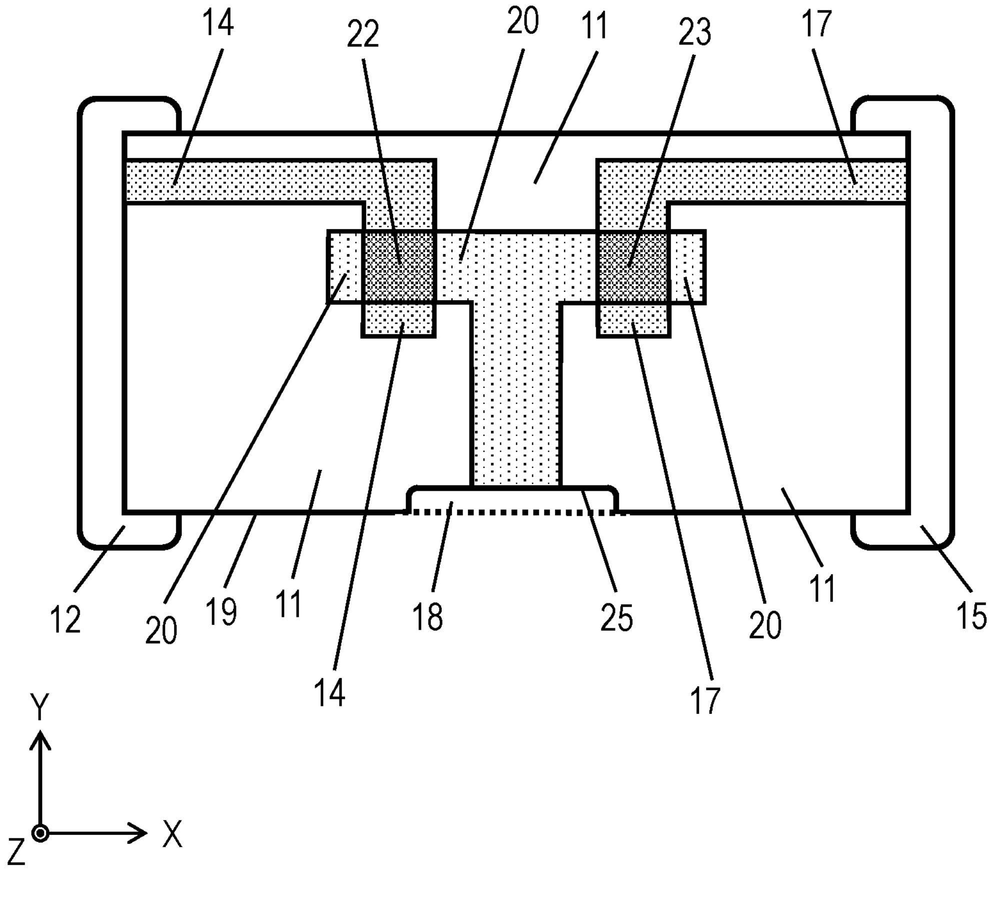
FIG. 10 is a transparent view of the laminated varistor according to the fifth exemplary embodiment.

FIG. 9 is a perspective view of a laminated varistor according to a fifth exemplary embodiment of the present disclosure. FIG. 10 is a transparent view of the laminated varistor as viewed from above. In this laminated varistor, concave part 25 is provided in first side surface 19, and third external electrode 18 is provided on the inside of concave part 25. Concave part 25 has an oval shape with a concave part length of about 300 μm and a radius dimension of about 50 μm when viewed from above. In this case, the length of concave part 25 is desirably about 10% to 30% of the entire length, and the radius dimension is desirably about 50 μm to 200 μm. By providing concave part 25 in first side surface 19 and providing third external electrode 18 on the inside of concave part 25, the shape of third external electrode 18 can be stabilized. As a result, a laminated varistor with a small variation in stray capacitance or the like can be obtained. Note that the shape of the concave part may be an elliptical shape, a semicircular shape, or the like without being limited to an oval shape.

In addition, it is more desirable not to provide a concave part in second side surface 21. By doing in this way, the areas of the internal electrodes can be effectively used, and directionality becomes easier to identify by appearance. As a result, manufacturing process can be simplified.

Figure 11:
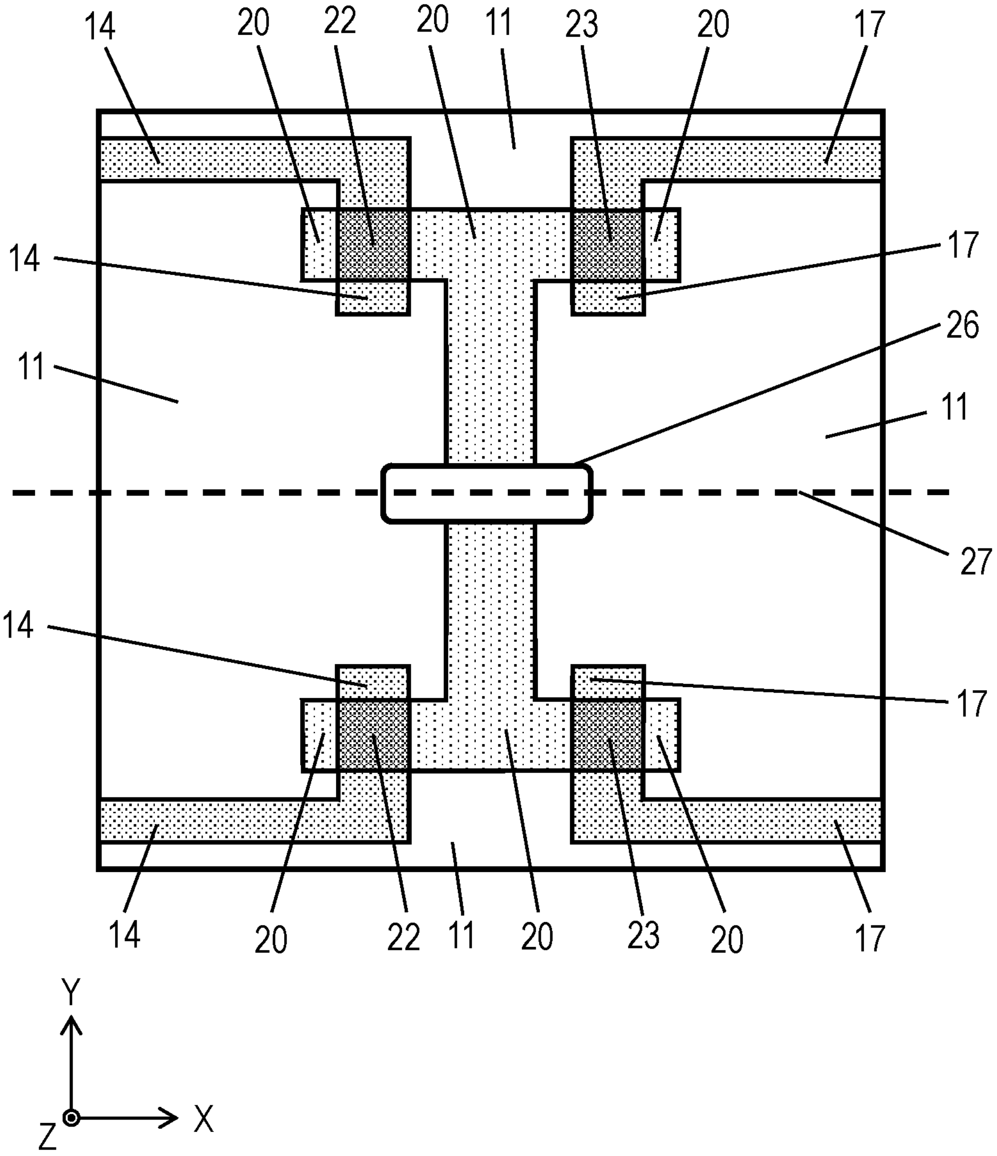
FIG. 11 is a transparent view of the laminated varistor before being cut.

As a method of providing concave part 25 only in first side surface 19, there is the following method. First, internal electrodes are configured such that surfaces to become the first side surfaces face each other, and a varistor layer is laminated, as illustrated in FIG. 11. Thereafter, through hole 26 is formed by punching or the like, electrode paste to become the third external electrode is coated on the inside of through hole 26, and the varistor layer is divided into individual pieces by cutting along cutting line 27 passing through hole 26. As a result, the formation of concave part 25 can be achieved.

Aspects

As apparent from the above exemplary embodiments, the present disclosure includes the following aspects. In the following, reference numerals are given in parentheses in order to clearly indicate the correspondence with the exemplary embodiments.

A laminated varistor according to a first aspect of the present disclosure includes sintered body (11), first external electrode (12), second external electrode (15), third external electrode (18), first internal electrode (14), second internal electrode (17), and third internal electrode (20). Sintered body (11) has a rectangular parallelepiped shape having upper surface (28) and lower surface (29), and first end surface (13), first side surface (19), second end surface (16), and second side surface (21) that are sequentially arranged in a counterclockwise direction as viewed from upper surface (28). In addition, sintered body (11) is formed by laminating a plurality of varistor layers (11*a*, 11*b*, 11*c*). Each of the plurality of varistor layers (11*a*, 11*b*, 11*c*) has main surface (11*a*), back surface (11*b*), and four side surfaces. Of two adjacent varistor layers (11*a*, 11*b*), main surface (28*a*, 28*b*) on one side and back surface (29*a*, 29*b*) on the other side are joined. The four side surfaces of each of the plurality of varistor layers (11*a*, 11*b*, 11*c*) become first end surface (13), first side surface (19), second end surface (16), and second side surface (21) of sintered body (11). In addition, one varistor layer (11*a*) of the plurality of varistor layers (11*a*, 11*b*, 11*c*) has third internal electrode (20). At least one layer (11*b*) of the others of the plurality of varistor layers (11*a*, 11*b*, 11*c*) has at least one of first internal electrode (14) and second internal electrode (17). First external electrode (12) is provided on first end surface (13) of sintered body (11). Second external electrode (15) is provided on second end surface (16) of sintered body (11). Third external electrode (19) is provided on first side surface (19) of sintered body (11). First internal electrode (14) is electrically connected to first external electrode (12). Second internal electrode (17) is electrically connected to second external electrode (15). Third internal electrode (20) is electrically connected to third external electrode (18). First internal electrode (14) and third internal electrode (18) have a first overlap when viewed from upper surface (28) of sintered body (11). First varistor region (22) is formed by the first overlap. Second internal electrode (17) and third internal electrode (18) have a second overlap when viewed from the upper surface of sintered body (11). Second varistor region (23) is formed by the second overlap. First varistor region (22) and second varistor region (23) are arranged at positions closer to second side surface (21) than to first side surface (19).

According to the laminated varistor of the first aspect, it is possible to cause almost no stray capacitance between third external electrode (18) and first internal electrode (14) or second internal electrode (17). As a result, the stray capacitance to occur between first internal electrode (14) or second internal electrode (17) and third external electrode (18) can be reduced. Along with that, a variation in the stray capacitance due to a variation in third external electrode (18) can also be reduced.

In the laminated varistor of the first aspect according to a second aspect of the present disclosure, first internal electrode (14) is connected to first external electrode (12) at a position closer to second side surface (21) of sintered body (11) than third internal electrode (20) is. In addition, first internal electrode (14) extends toward second end surface (16) of sintered body (11). First internal electrode (14) bends at another position closer to second side surface (21) of sintered body (11) than third internal electrode (20) is, extends toward first side surface (19), and has the first overlap.

In the laminated varistor of the first aspect according to a third aspect of the present disclosure, first internal electrode (14) and second internal electrode (17) are provided in different varistor layers (11*a*, 11*b*). First varistor region (22) and second varistor region (23) are arranged at different positions when viewed from upper surface (28) of sintered body (11).

According to the laminated varistor of the third aspect, interaction between first internal electrode (14) and second internal electrode (17) can be reduced.

In the laminated varistor of the first aspect according to a fourth aspect of the present disclosure, third internal electrodes (20*a*, 20*b*) are provided in two different varistor layers (11*d*, 11*e*). Third internal electrode (20*a*) in varistor layer (11*e*) on one side overlaps first internal electrode (14) when viewed from upper surface (28) of sintered body (11). As a result, first varistor region (22) is formed. Third internal electrode (20*b*) in varistor layer (11*d*) on the other side overlaps second internal electrode (17) when viewed from upper surface (28) of sintered body (11). As a result, second varistor region (23) is formed. First varistor region (22) and second varistor region (23) are arranged at different positions when viewed from the upper surface of sintered body (11).

According to the laminated varistor of the fourth aspect, the interaction between first internal electrode (14) and second internal electrode (17) can be further reduced.

In the laminated varistor of the first aspect according to a fifth aspect of the present disclosure, convex part (24) is provided on first side surface (19). Third external electrode (18) is provided on convex part (24).

According to the laminated varistor of the fifth aspect, a distance between first internal electrode (14) and third internal electrode (18) and a distance between second internal electrode (17) and third internal electrode (18) can be increased. As a result, stray capacitance can be reduced. In addition, by providing third external electrode (18) on convex part (24), a shape of third external electrode (18) can be stabilized. As a result, a variation in capacitance of the laminated varistor can be reduced. In addition, by providing convex part (24), the surface on which third external electrode 18 is to be provided can be easily recognized.

In the laminated varistor of the first aspect according to a sixth aspect of the present disclosure, concave part (25) is provided in first side surface (19). Third external electrode (18) is provided on the inside of concave part (25).

According to the laminated varistor of the sixth aspect, concave part (25) is provided in first side surface (19), and third external electrode (18) is provided on the inside of concave part (25). As a result, the shape of third external electrode (18) can be stabilized. As a result, a laminated varistor with a small variation in stray capacitance or the like can be obtained.

In the laminated varistor of the sixth aspect according to a seventh aspect of the present disclosure, second side surface (21) is flat.

According to the laminated varistor of the seventh aspect, the areas of internal electrodes (14, 17, 18) can be effectively used, and directionality becomes easier to identify by appearance. As a result, manufacturing process can be simplified.

The laminated varistor according to the present disclosure can reduce stray capacitance to occur between an internal electrode and an external electrode, and can also reduce a variation in the stray capacitance due to a variation in the external electrode. As a result, the laminated varistor is industrially useful.

The invention claimed is:

1. A laminated varistor comprising:

a sintered body having a rectangular parallelepiped shape having an upper surface and a lower surface, and a first end surface, a first side surface, a second end surface, and a second side surface that are sequentially arranged in a counterclockwise direction as viewed from the upper surface;

a first external electrode;

a second external electrode;

a third external electrode;

a first internal electrode;

a second internal electrode; and a third internal electrode, wherein the sintered body includes a plurality of varistor layers which are laminated together, the plurality of varistor layers each having a main surface, a back surface, and four side surfaces, the main surface of each of the plurality of varistor layers being jointed to the back surface of another varistor layer adjacent to the varistor layer, the four side surfaces of each of the plurality of varistor layers forming the first end surface, the first side surface, the second end surface, and the second side surface of the sintered body, one of the plurality of varistor layers is provided with the third internal electrode, and at least another one of the plurality of varistor layers is provided with at least one of the first internal electrode and the second internal electrode, the first external electrode is provided on the first end surface of the sintered body, the second external electrode is provided on the second end surface of the sintered body, and the third external electrode is provided on the first side surface of the sintered body, the first internal electrode is electrically connected to the first external electrode, the second internal electrode is electrically connected to the second external electrode, and the third internal electrode is electrically connected to the third external electrode, the first internal electrode and the third internal electrode have a first overlap when viewed from the upper surface of the sintered body, and a first varistor region is formed by the first overlap, the second internal electrode and the third internal electrode have a second overlap when viewed from the upper surface of the sintered body, and a second varistor region is formed by the second overlap, and the first varistor region and the second varistor region are arranged at positions closer to the second side surface than to the first side surface.

2. The laminated varistor according to claim 1, wherein the first internal electrode is connected to the first external electrode at a position closer to the second side surface of the sintered body than the third internal electrode is, and extends toward the second end surface of the sintered body is bent at another position closer to the second side surface of the sintered body than the third internal electrode is, and extends toward the first side surface to form the first overlap.

3. The laminated varistor according to claim 1, wherein the first internal electrode and the second internal electrode are provided in the varistor layers different from each other, and the first varistor region and the second varistor region are arranged at different positions when viewed from the upper surface of the sintered body.

4. The laminated varistor according to claim 1, wherein the third internal electrode is provided in each of two of the varistor layers different from each other, the third internal electrode in one of the two of the varistor layers forms the first varistor region by overlapping the first internal electrode when viewed from the upper surface of the sintered body, the third internal electrode in an other of the two of the varistor layers forms the second varistor region by overlapping the second internal electrode when viewed from the upper surface of the sintered body, and the first varistor region and the second varistor region are arranged at different positions when viewed from the upper surface of the sintered body.

5. The laminated varistor according to claim 1, wherein the first side surface includes a convex part on which the third external electrode is provided.

6. The laminated varistor according to claim 1, wherein the first side surface includes a concave part in which the third external electrode is provided.

7. The laminated varistor according to claim 6, wherein the second side surface is flat.

8. A laminated varistor comprising:

a sintered body having a rectangular parallelepiped shape having:

a first end surface and a second end surface disposed opposite to the first end surface in a first direction, the first direction which is along to a long side of the rectangular parallelepiped shape, a first side surface and a second side surface disposed opposite to the first side surface in a second direction, a first main surface and a second main surface disposed opposite to the first main surface in a third direction, and a plurality of varistor layers which are laminated in the third direction, a first internal electrode being formed in one of the layers of the plurality of varistor layers, a second internal electrode being formed in one of the layers of the plurality of varistor layers, a third internal electrode being formed in one of the layers of the plurality of varistor layers, the layer in which the third internal electrode is formed is different from the layer in which the first internal electrode is formed and the layer in which the second internal electrode is formed, a first external electrode being formed at the first end surface and is connected electrically to the first internal electrode, a second external electrode being formed at the second end surface and is connected electrically to the second internal electrode, a third external electrode being formed at the first side surface and is connected electrically to the third internal electrode, a first varistor region, a part of the first internal electrode faces a part of the third internal electrode at the first varistor region, a second varistor region, a part of the second internal electrode faces a part of the third internal electrode at the second varistor region, the first varistor region and the second varistor region are disposed at positions nearer the second side surface than the first side surface.

9. The laminated varistor according to claim 8, wherein the first internal electrode includes a first part and a second part, the first part is extended to the first direction from the first end surface between the third internal electrode and the second side surface, and the second part is extended from the first part to the first side surface, the first varistor region is formed by a part of the second part facing the part of the third internal electrode.

10. The laminated varistor according to claim 8, wherein the layer of the plurality of varistor layers in which the first internal electrode is formed is different from the layer of the plurality of varistor layers in which the second internal electrode is formed, the first varistor region does not overlap the second varistor region at the third direction.

11. The laminated varistor according to claim 8, includes two of the third internal electrodes, the varistor layer in which one of the third internal electrodes is different from the varistor layer in which the other of the third internal electrodes is formed, the first varistor region is formed by part of the one of the third internal electrodes faces a part of the first internal electrode, the second varistor region is formed by part of the other of the third internal electrodes faces a part of the second internal electrode, the first varistor region does not overlap the second varistor region at the third direction.

12. The laminated varistor according to claim 8, wherein the first side surface includes a protrusion, the third external electrode is formed at the protrusion.

13. The laminated varistor according to claim 8, wherein the first side surface includes a concave, the third external electrode is formed at the concave.

14. The laminated varistor according to claim 8, wherein the second side surface is flat.

15. The laminated varistor according to claim 8, wherein no external electrode is disposed at the second side surface.

* * * * *